United States Patent [19]

Koizumi et al.

[11] 4,323,935
[45] Apr. 6, 1982

[54] NONPROGRAM SECTION DETECTION MECHANISM IN A CASSETTE TAPE PLAYER

[75] Inventors: Satoru Koizumi; Takashi Shimamura; Sadao Uchiyama, all of Higashihiroshima, Japan

[73] Assignee: Sharp Kabushiki Kaisha, Osaka, Japan

[21] Appl. No.: 95,083

[22] Filed: Nov. 15, 1979

[30] Foreign Application Priority Data

Nov. 15, 1978 [JP] Japan .............................. 53/140894
Nov. 15, 1978 [JP] Japan .............................. 53/140895

[51] Int. Cl.³ .................... G11B 15/44; G11B 19/26; G11B 27/22
[52] U.S. Cl. .................... 360/73; 360/72.1; 360/74.4
[58] Field of Search .............. 360/73, 72.2, 72.1, 360/74.1, 74.4, 71, 69; 179/100.1 PS, 100.1 S, 100.1 TC; 369/22, 30, 33

[56] References Cited

U.S. PATENT DOCUMENTS 3,541,271 11/1970 Joslow et al. ............. 179/100.1 PS
3,624,308 11/1971 Kozu et al. ........................ 360/73
3,665,117 5/1972 Staar ......................... 179/100.1 PS
3,893,177 7/1975 Takenaka ........................ 360/72.1
4,048,659 9/1977 Fink, Jr. et al. ........... 179/100.1 PS Primary Examiner—Alfred H. Eddleman
Attorney, Agent, or Firm—Birch, Stewart, Kolasch and Birch

[57] ABSTRACT

A cassette tape player comprises a reproduction head mounted on a subchassis, and a nonprogram section detection circuit for searching a nonprogram section provided between two adjacent programs recorded on a magnetic tape while the magnetic tape is driven to travel at a fast speed. When a fast forward lever or a fast rewind lever is locked under the condition where a playback lever is locked and the subchassis is held at a predetermined position, a switch mounted on the subchassis is switched on to power supply the nonprogram section detection circuit. That is, the cassette tape player is placed in a nonprogram section detection mode when both the playback lever, and the fast forward lever or the fast rewind lever are locked. Upon detecting the nonprogram section, a plunger is activated to unlock the fast forward lever or the fast rewind lever to return the cassette tape player to a normal playback mode.

15 Claims, 9 Drawing Figures

FIG. I

NONPROGRAM SECTION DETECTION MECHANISM IN A CASSETTE TAPE PLAYER

BACKGROUND AND SUMMARY OF THE INVENTION

The present invention relates to a nonprogram section detection mechanism for selecting a desired program in a cassette tape player.

A program selection system has been developed, wherein a nonprogram section provided between two adjacent programs recorded on a magnetic tape is sensed while the magnetic tape is driven to travel at a fast speed, and the tape drive is shifted to the normal playback mode when the nonprogram section positioned in front of a desired program is detected. The nonprogram section can be a nonrecorded section of a predetermined length, or the nonprogram section can be marked by a predetermined code signal for detection purposes.

In either case, a nonprogram section detection circuit must be placed in an operative condition only when a program selection operation is desired to be performed to ensure an accurate operation.

Accordingly, an object of the present invention is to provide a nonprogram section detection mechanism in a cassette tape player.

Another object of the present invention is to provide a novel lock mechanism for placing a nonprogram section detection circuit in an operative condition when a program selection operation is desired to be performed.

Still another object of the present invention is to provide a mechanism for performing a cue operation or a review operation by interrupting the nonprogram section detection operation.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a reproduction magnetic head is mounted on a subchasis which is slided when a playback button is depressed. A fast forward button and/or a fast rewind button is associated with a nonprogram section detection slidable plate. A switch is supported by the subchasis, and is switched on when the nonprogram section detection slidable plate is shifted to a predetermined position under the condition where the playback button is locked. A nonprogram section detection circuit is associated with the above-mentioned switch to perform the nonprogram section detection operation.

A detection output of the nonprogram section detection circuit is applied to a plunger which activates the nonprogram section detection slidable plate, thereby unlocking the fast forward button and/or the fast rewind button. In this way, the tape player is placed in the normal playback mode when a nonprogram section positioned in front of a desired program is detected.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
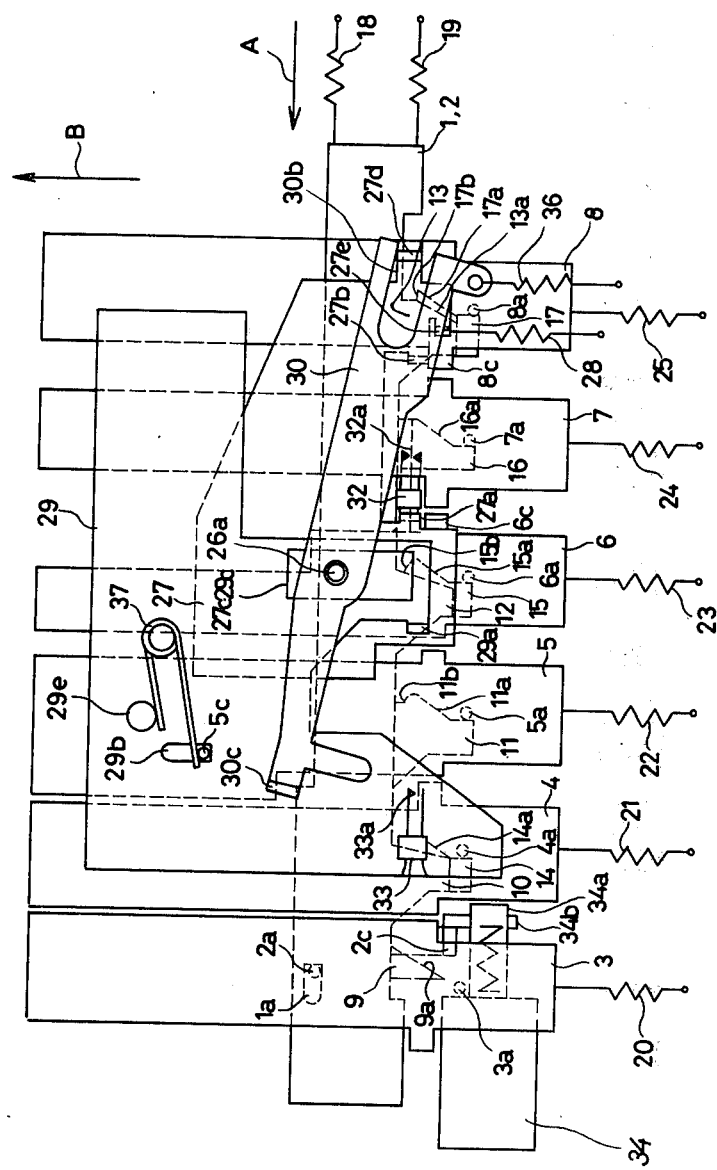
FIG. 1 is a plan view of an essential part of an embodiment of a nonprogram section detection mechanism of the present invention, wherein the mechanism is placed in a stop mode.
Figure 2:
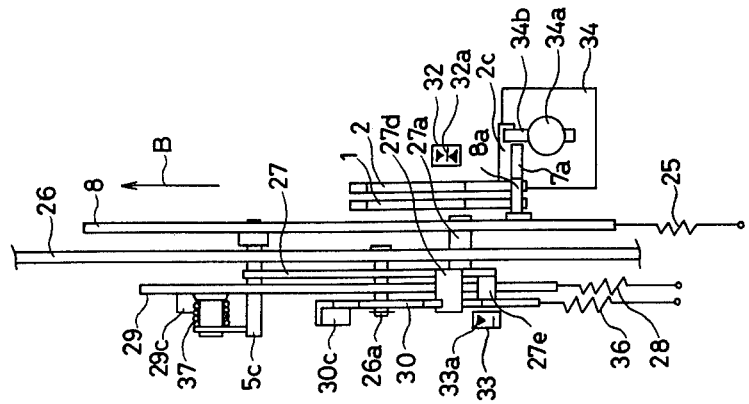
FIG. 2 is a side view of the nonprogram section detection mechanism of FIG. 1.

FIGS. 1 and 2 show an embodiment of a nonprogram section detection mechanism of the present invention, wherein the mechanism is placed in a stop mode.

The nonprogram section detection mechanism mainly comprises a chassis 26, a subchassis 29, a nonprogram section detection slidable plate 27, a playback lever 5, a fast rewind lever 6, and a fast forward lever 8. The playback lever 5 is associated with the subchassis 29 in such a manner that the subchasis 29 is slided in a predetermined direction in response to the locking and unlocking movement of the playback lever 5. The fast rewind lever 6 and the fast forward lever 8 are associated with the nonprogram section detection slidable plate 27 in such a manner that the nonprogram section detection slidable plate 27 is slided in a predetermined direction in response to the locking and unlocking movement of the fast rewind lever 6 or the fast forward lever 8.

A subchassis shift lever 30 is rotated, when the nonprogram section detection slidable plate 27 is shifted, in a fashion to push back the subchassis 29. A second switch 33 is secured on the subchassis 29 via an angle (not shown). The second switch 33 is actuated when the subchassis shift lever 30 is rotated.

The nonprogram section detection mechanism further comprises lock levers 1 and 2 for locking the playback lever 5, the fast rewind lever 6 and the fast forward lever 8, a stop lever 3, a record lever 4, and a fast movement release lever 7. These levers 3, 4, 5, 6, 7 and 8 are slidably mounted on the chassis 26.

Figure 9:
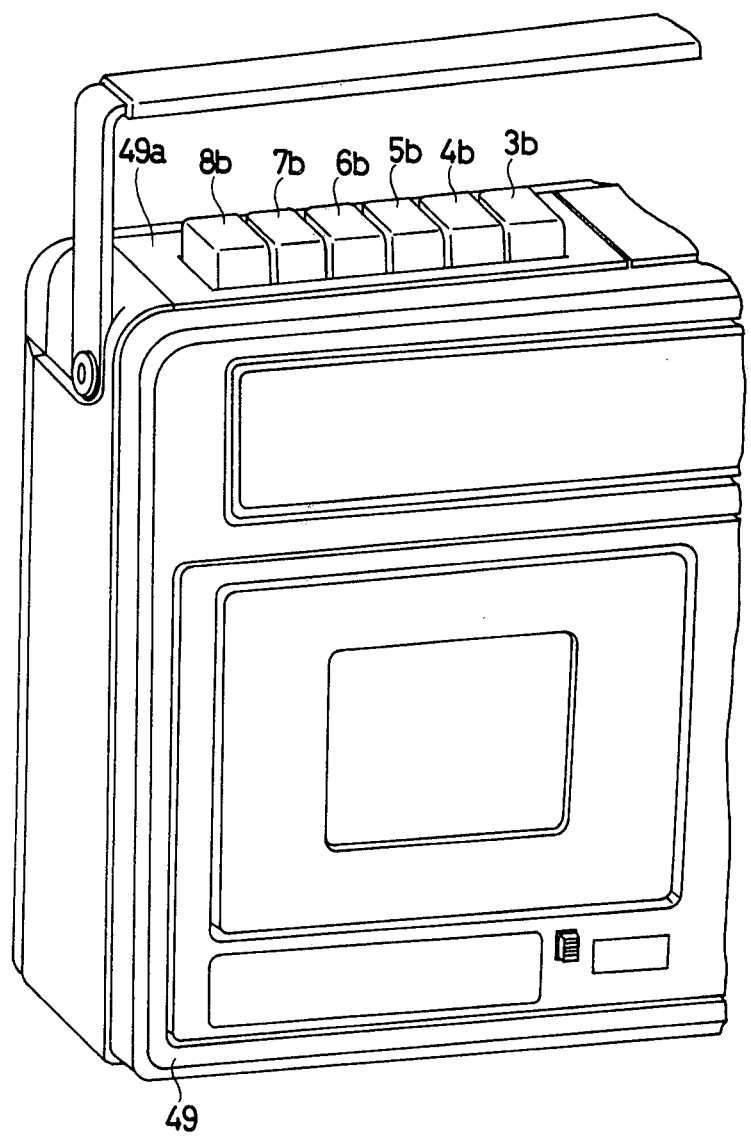
FIG. 9 is a perspective view of a cassette tape player employing the nonprogram section detection mechanism of the present invention.

FIG. 9 shows a cassette tape player employing the nonprogram section detection mechanism of FIGS. 1 and 2.

Pushbuttons 3b, 4b, 5b, 6b, 7b, and 8b are disposed on an upper surface 49a of a cassette tape player body 49. Each pushbutton 3b, 4b, 5b, 6b, 7b and 8b is fixed to the stop lever 3, the record lever 4, the playback lever 5, the fast rewind lever 6, the fast movement release lever 7, and fast forward lever 8.

Detailed construction of the nonprogram section detection mechanism will be described with reference to FIGS. 1 and 2.

An ellipse opening 29b is formed in the subchassis 29 at a predetermined position, the ellipse opening 29b having the longer axis in the direction corresponding to the shift movement of the subchassis 29. A pin 5c is secured to the playback lever 5, which is accommodated in the ellipse opening 29b. Another pin 29e is secured to the subchassis 29, and a spring 37 is disposed between the two pins 5c and 29e, whereby the subchassis 29 is shifted, when the playback lever 5 is shifted, in a direction corresponding to the shift movement of the playback lever 5.

A protrusion 29a is provided on the subchassis 29 at a predetermined position, which is associated with the subchassis shift lever 30. More specifically, when the subchassis shift lever 30 is rotated in the counterclockwise direction in FIG. 1 the protrusion 29a is depressed and, therefore, the subchassis 29 is slightly depressed backward against the spring 37.

The nonprogram section detection slidable plate 27 is interposed between the subchassis surface and the lever surface. Protrusions 27a and 27b are provided on the nonprogram section detection slidable plate 27 at predetermined positions, which are associated with a protrusion 6c formed on the fast rewind lever 6, and a protrusion 8c formed on the fast forward lever 8, respectively. Accordingly, the nonprogram section detection slidable plate 27 is shifted, when the fast rewind lever 6 or the fast forward lever 8 is depressed, in the direction corresponding to the shift movement of the lever 6 or 8.

Another protrusion 27d is provided on the nonprogram section detection slidable plate 27 at a predetermined position, which is engaged in an engaging portion 30b formed in the subchassis shift lever 30. The subchassis shift lever 30 is rotatably secured around a shaft 26a, the rotation being respective to ths shift movement of the nonprogram section detection slidable plate 27. A spring 28 is disposed between the chassis 26 and an engaging member 27e formed on the nonprogram section detection slidable plate 27, whereby the nonprogram section detection slidable plate 27 is biased against the depressing movement of the levers 6 and 8.

Rectangular openings 27c and 29c are formed in the nonprogram section detection slidable plate 27 and the subchassis 29, respectively, through which the shaft 26a, which is secured to the chassis 26, is provided to rotatably support the subchassis shift lever 30. The engaging portion 30b is formed at one end of the subchassis shift lever 30, which engages the protrusion 27d provided on the nonprogram section detection slidable plate 27. A spring 36 is disposed between the end of the subchassis shift lever 30 and the chassis 26 to bias the subchassis shift lever 30 in the clockwise direction in FIG. 1. Another engaging portion 30c is provided at the other end of the subchassis shift lever 30, which is associated with a movable contact 33a of the normally open second switch 33 fixed to the subchassis 29 via an angle (not shown). The subchassis shift lever 30 is disposed above the nonprogram section detection slidable plate 27 in FIG. 1.

The lock levers 1 and 2 are disposed below the stop lever 3, the record lever 4, the playback lever 5, the fast rewind lever 6, the fast movement release lever 7 and the fast forward lever 8 in FIG. 1. The lock levers 1 and 2 are slidable in a direction perpendicular to the shift movement of the levers 3, 4, 5, 6, 7 and 8. An engaging pin 2a is secured to the lock lever 2, and an ellipse opening 1a is formed in the lock lever 1 so that the engaging pin 2a is accommodated in the ellipse opening 1a. When the lock lever 1 is shifted left in FIG. 1, the lock lever 2 is also shifted left in unison with the lock lever 1. When the lock lever 2 is shifted left, the lock lever 1 is held stationary without regard to the movement of the lock lever 2.

A shift 5a is fixed to the rear surface of the playback lever 5. A protrusion 11 is provided on the lock lever 1, which comprises a tapered portion 11a and an engaging portion 11b. The tapered portion 11a is associated with the shaft 5a in such a manner that the lock lever 1 is slided left when the playback lever 5 is depressed, and the engaging portion 11b accommodates the shaft 5a to prevent the playback lever 5 from returning to the original position.

A shaft 4a is fixed to the rear surface of the record lever 4.

A protrusion 10 is formed on the lock lever 1, which comprises a tapered portion 10a. The tapered portion 10a and the shaft 4a function, in combination, to shift left the lock lever 1 when the record lever 4 is depressed.

A shaft 6a is fixed to the rear surface of the fast rewind lever 6. A protrusion 12 is formed on the lock lever 1, which comprises a tapered portion 12a. The shaft 6a and the tapered portion 12a function, in combination, to shift left the lock lever 1 when the fast rewind lever 6 is depressed.

The lock lever 1 further comprises a protrusion 13 having a tapered portion 13a which is associated with a shaft 8a secured to the rear surface of the fast forward lever 8 for shifting left the lock lever 1 when the fast forward lever 8 is depressed, and a protrusion 9 having a tapered portion 9a which is associated with a shaft 3a secured to the rear surface of the stop lever 3 for shifting left the lock lever 1 when the stop lever 3 is depressed under the condition where the lock lever 1 is slightly shifted left.

The lock lever 2 comprises a protrusion 14 including a tapered portion 14a and an engaging portion 14b. The tapered portion 14a functions, in combination with the shaft 4a, to shift left the lock lever 2 when the record lever 4 is depressed. The engaging portion 14b accommodates the shaft 4a to prevent the record lever 4 from returning to the original position.

A protrusion 15 is provided on the lock lever 2, which comprises a tapered portion 15a and an engaging portion 15b. The tapered portion 15a functions, in combination with the shaft 6a, to shift left the lock lever 2 when the fast rewind lever 6 is depressed. The engaging portion 15b accommodates the shaft 6a to prevent the fast rewind lever 6 from returning to the original position.

A protrusion 16 is provided on the lock lever 2, which comprises a tapered portion 16a. A shaft 7a is fixed to the rear surface of the fast movement release lever 7. The shaft 7a and the tapered portion 16a function, in combination, to shift left the lock lever 2 when the fast movement release lever 7 is depressed.

A plunger 34 comprises a movable shaft 34a to which a pin 34b is secured. A protrusion 2c is provided on the lock lever 2, which is associated with the pin 34b for shifting left the lock lever 2.

The lock lever 2 further comprises a protrusion 17 including a tapered portion 17a for shifting left the lock lever 2 in combination with the shaft 8a secured to the fast forward lever 8, and an engaging portion 17b for preventing the fast forward lever 8 from returning to the original position in combination with the shaft 8a.

The nonprogram section detection mechanism further comprises a first switch 32 secured to the chassis 26 via an angle (not shown). The first switch 32 includes a movable contact 32a associated with the shaft 7a fixed to the fast movement release lever 7. Springs 18 and 19 are disposed between the chassis 26 and the lock levers 1 and 2, respectively, for biasing rightward the lock levers 1 and 2, thereby the lock levers 1 and 2 are held at their original positions as long as the levers 3, 4, 5, 6, 7 and 8 are not depressed.

Springs 20, 21, 22, 23, 24 and 25 are disposed between the chassis 26 and the levers 3, 4, 5, 6, 7 and 8, respectively, in such a manner that the shafts secured to the levers 3, 4, 5, 6, 7 and 8 are free from the lock levers 1 and 2. That is, the levers 3, 4, 5, 6, 7 and 8 are held at their nondepressed conditions by the springs 20, 21, 22, 23, 24 and 25.

Figure 8:
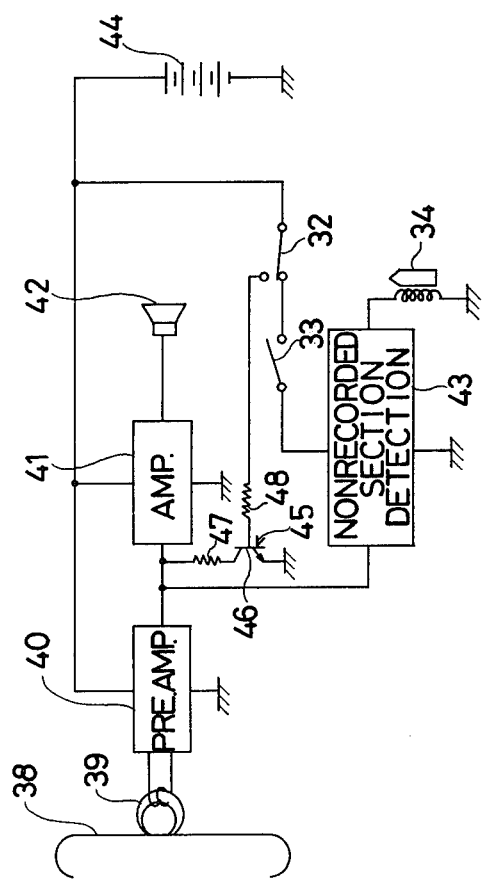
FIG. 8 is a block diagram of a tape player employing a nonrecorded section detection circuit associated with the nonprogram section detection mechanism of the present invention.

FIG. 8 shows a tape player employing a nonrecorded section detection circuit associated with the nonprogram section detection mechanism of the present invention.

The tape player mainly comprises a record/playback magnetic head 39 for recording information onto and/or reproducing information from a magnetic tape 38. An output signal derived from the magnetic head 39 is applied to a preliminary amplifier 40, which develops an output signal toward a main amplifier 41 and a nonrecorded section detection circuit 43. The preliminary amplifier 40 and the main amplifier 41 are power supplied directly from a power supply source 44. The nonrecorded section detection circuit 43 is power supplied from the power supply source 44 through a series circuit comprising the first switch 32 and the second switch 33. A detection output of the nonrecorded section detection circuit 43 is applied to the plunger 34 for activating it.

The nonrecorded section detection circuit 43 can be of the conventional construction. An example of the nonrecorded section detection circuit 43 is disclosed in U.S. Pat. No. 3,893,177, "AUTOMATIC PROGRAM FINDER SYSTEM FOR TAPE DECKS" by Takashi Takenaka, issued on July 1, 1975. Alternatively, a coded mark signal can be recorded on the magnetic tape 38 at the nonprogram section, and a code signal detection circuit can be employed instead of the nonrecorded section detection circuit 43.

The tape player further comprises a speaker 42 connected to the main amplifier 41, and a muting circuit 45. The muting circuit 45 comprises a transistor 46 of which the collector electrode is connected to the output terminal of the preliminary amplifier 40 via a resistor 47, the emitter electrode is grounded, and the base electrode is connected to the normally open terminal of the first switch 32 via a resistor 48.

Figure 3:
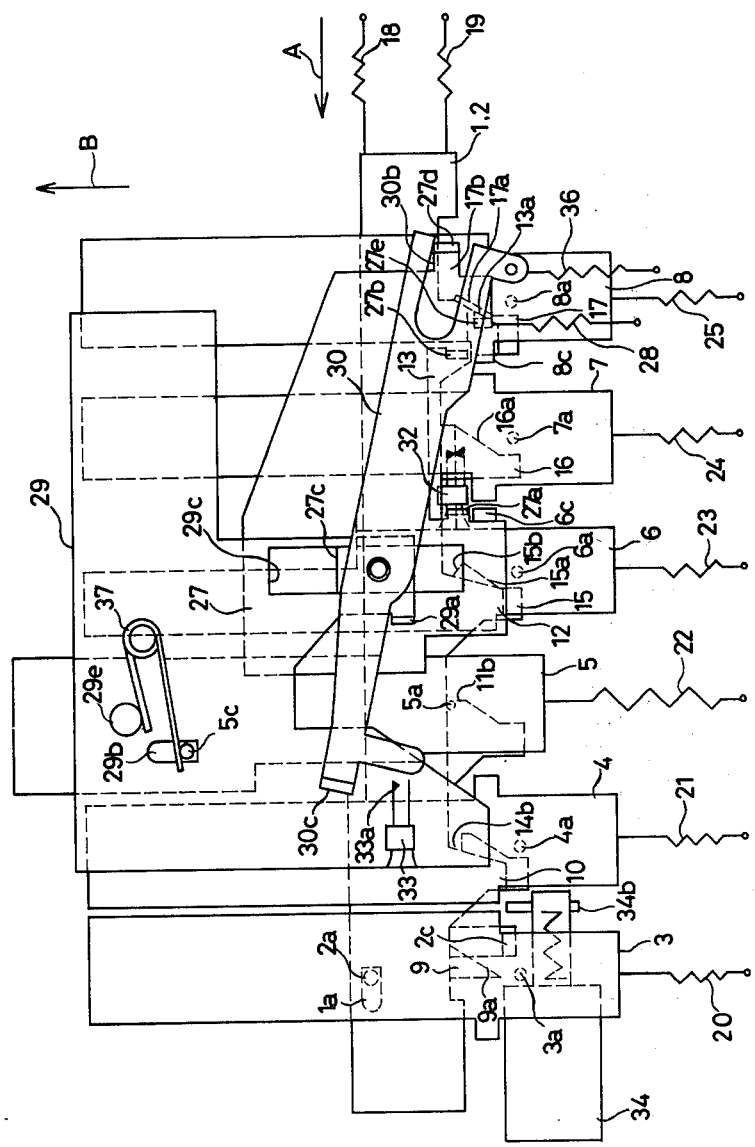
FIG. 3 is a plan view of the nonprogram section detection mechanism of FIG. 1, wherein the mechanism is placed in a normal playback mode.

FIG. 3 shows the normal playback mode, wherein the playback lever 5 is depressed against the spring 22. Like elements corresponding to those of FIGS. 1 and 2 are indicated by like numerals.

The shaft 5a secured to the playback lever 5 is accommodated in the engaging portion 11b of the protrusion 11 to lock the playback lever 5, and the lock lever 1 is shifted left. At the same time, the pin 5c is forced to travel within the opening 29b and, therefore, the subchassis 29 is shifted in the direction shown by an arrow B in FIG. 3 due to the spring 37 disposed between the pins 5c and 29e. And, the subchassis 29 is held at a position as shown in FIG. 3. As is well known, the magnetic head 39 is mounted on the subchassis 29.

Under these conditions, the second switch 33 is off because the subchassis shift lever 30 is not rotated. Accordingly, the nonrecorded section detection circuit 43 does not operate. The preliminary amplifier 40 and the main amplifier 41 operate to develop the reproduction sounds through the speaker 42.

Figure 4:
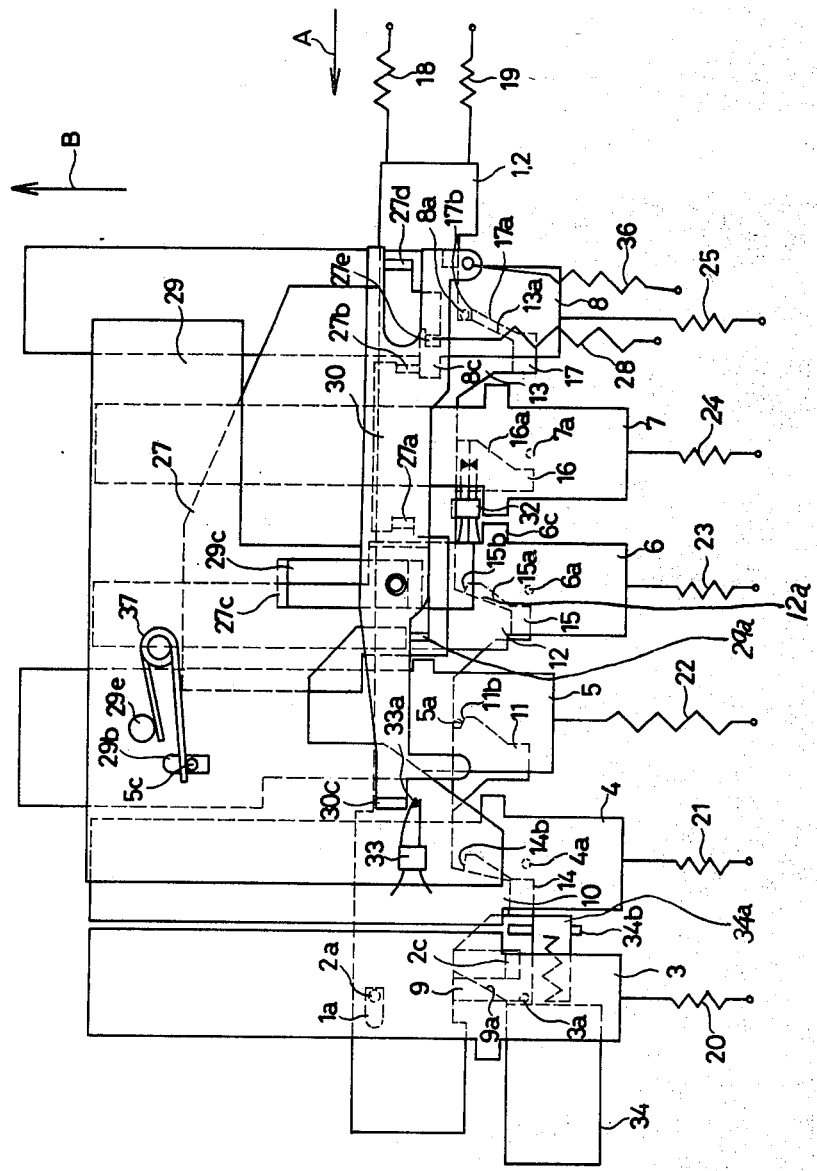
FIG. 4 is a plan view of the nonprogram section detection mechanism of FIG. 1, wherein the mechanism is placed in a nonprogram section detection mode under the fast forward operation.

FIG. 4 shows the nonprogram section detection mode under the fast forward movement, wherein both the playback lever 5 and the fast forward lever 8 are depressed. Like elements corresponding to those of FIGS. 1 and 2 are indicated by like numerals.

If the fast forward lever 8 is depressed when the normal playback operation is conducted, the shaft 8a functions to depress the tapered portion 17a for shifting left the lock lever 2 against the spring 29. Thereafter, the shaft 8a is accommodated in the engaging portion 17b to lock the fast forward lever 8. At this moment, the engaging pin 2a secured to the lock lever 2 travels freely in the opening 1a formed in the lock lever 1. That is, both the playback lever 5 and the fast forward lever 8 are locked.

In response to the depressing movement of the fast forward lever 8, the protrusion 8c engages the protrusion 27b formed on the nonprogram section detection slidable plate 27, whereby the nonprogram section detection slidable plate 27 is slided in the direction shown by the arrow B in FIG. 3. When the nonprogram section detection slidable plate 27 is slided, the protrusion 27d is engaged in the engaging portion 30b and, therefore, the subchassis shift lever 30 is rotated in the counterclockwise direction in FIG. 4 against the spring 36.

When the subchassis shift lever 30 is rotated in the counterclockwise direction, the protrusion 29a is depressed to slightly shift the subchassis 29 in the counter direction to the arrow B in FIG. 4. At this moment the engaging portion 30c engages the movable contact 33a of the second switch 33 to turn on the second switch 33.

Under these conditions, the magnetic head 39 mounted on the subchassis 29 slightly contacts the magnetic tape 38. Since the second switch 33 is in the on state, the nonrecorded section detection circuit 43 is power supplied in addition to the preliminary amplifier 40 and the main amplifier 41.

When the nonrecorded section provided in front of a desired program is detected by the nonrecorded section detection circuit 43 while the magnetic tape 38 travels at the fast speed, the nonrecorded section detection circuit 43 develops the detection output to activate the plunger 34. When the plunger 34 is activated, the movable shaft 34a is shifted left in FIG. 4 and, therefore, the pin 34b becomes contact with the protrusion 2c to shift left the lock lever 2 against the spring 19. Consequently, the shaft 8a is released from the engaging portion 17b to return the fast forward lever 8 to its initial position by means of the spring 25. At the same time, the nonprogram section detection slidable plate 27 and the subchassis shift lever 30 are returned to their initial positions due to the springs 28 and 36, respectively.

Because of the returning of the subchassis shift lever 30, the second switch 33 is switched off to terminate the operation of the nonrecorded section detection circuit 43. The subchassis 29 is slightly shifted by the spring 37 in the direction shown by the arrow B and, therefore, the magnetic head 39 is tightly contacted with the magnetic tape 38 to perform the normal playback operation from the beginning of the desired program. FIG. 3 shows the normal playback operation mode.

Figure 6:
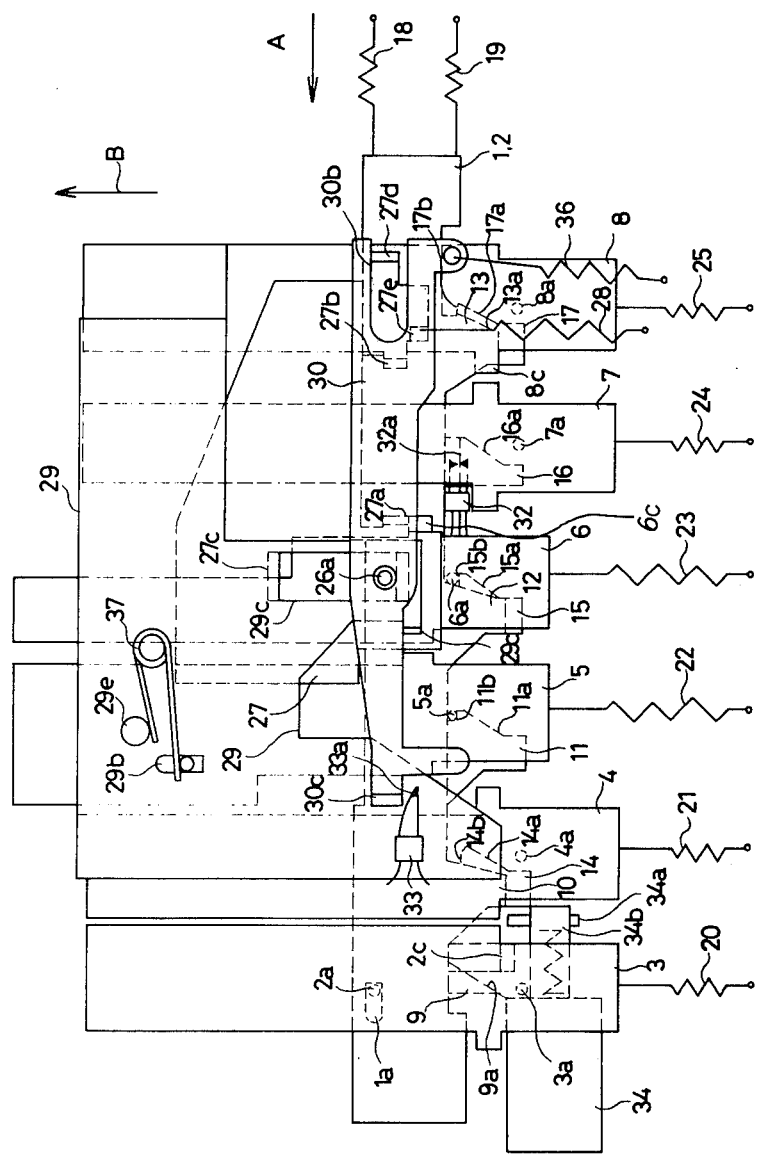
FIG. 6 is a plan view of the nonprogram section detection mechanism of FIG. 1, wherein the mechanism is placed in the nonprogram section detection mode under the fast rewind operation.

FIG. 6 shows the nonprogram section detection mode under the fast rewind movement, wherein both the playback lever 5 and the fast rewind lever 6 are depressed. Like elements corresponding to those of FIGS. 1 and 2 are indicated by like numerals.

The operation is similar to that achieved in the nonprogram section detection mode under the fast forward movement as shown in FIG. 4. The fast rewind lever 6 is depressed instead of the fast forward lever 8. The shaft 6a of the fast rewind lever 6 is accommodated in the engaging portion 15b of the protrusion 15 to lock the fast rewind lever 6. The protrusion 6c depresses the protrusion 27a provided on the nonprogram section detection slidable plate 27 to shift the nonprogram section detection slidable plate 27. The remaining operations are similar to that described with reference to FIG. 4 and, therefore, the detailed description thereof is omitted for the purpose of simplicity.

Figure 5:
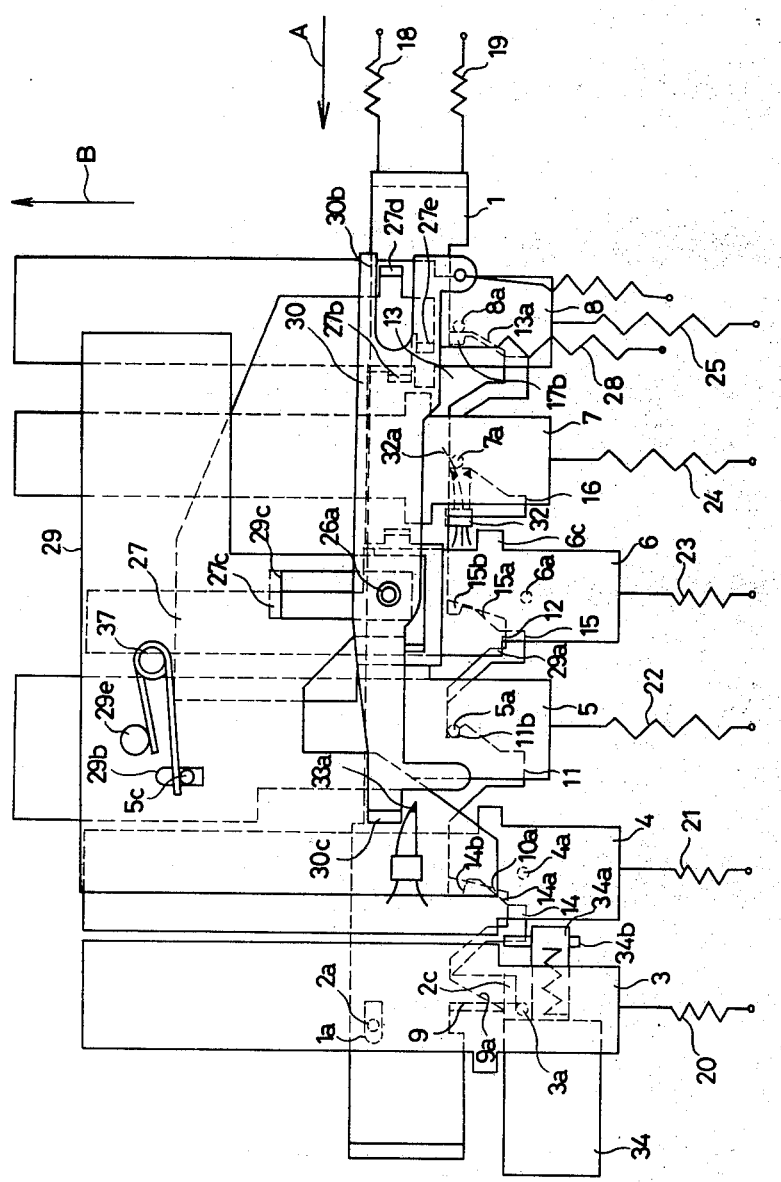
FIG. 5 is a plan view of the nonprogram section detection mechanism of FIG. 1, wherein the mechanism is placed in a cue mode under the fast forward operation.

FIG. 5 shows the cue mode under the fast forward movement, wherein both the fast movement release lever 7 and the fast forward lever 8 are simultaneously depressed when the tape player is placed in the normal playback mode. Like elements corresponding to those of FIGS. 1 and 2 are indicated by like numerals.

In response to the depression of the fast forward lever 8, the nonprogram section detection slidable plate 27, the subchassis 29 and the subchassis shift lever 30 operate in a same manner as discussed with reference to FIG. 4. In response to the depression of the fast movement release lever 7, the shaft 7a depresses the lock lever 2 toward left in combination with the protrusion 16.

Further, the shaft 7a depresses the movable contact 32a to close the normally open terminal of the first switch 32 and, therefore, the nonrecorded section detection circuit 43 does not operate, and the muting circuit 45 operates to attenuate the output signal derived from the preliminary amplifier 40, thereby controlling the output sounds generated from the speaker 42. Under these conditions, the cue operation is conducted, wherein the recorded information is reproduced while the magnetic tape 38 is driven to travel at the fast speed. If the depression of the fast movement release lever 7 and the fast forward lever 8 is released, the levers 7 and 8 are returned to their original positions by means of the springs 24 and 25, respectively, whereby the tape player is returned to the normal playback mode as shown in FIG. 3.

Figure 7:
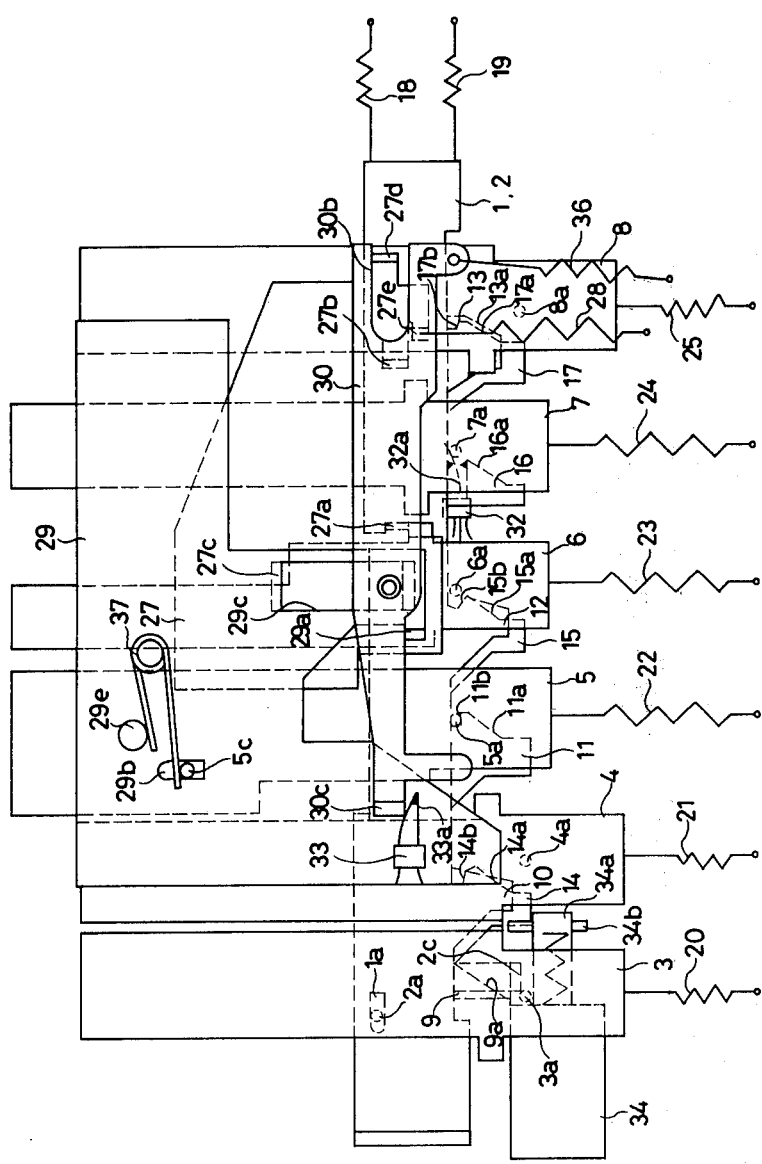
FIG. 7 is a plan view of the nonprogram section detection mechanism of FIG. 1, wherein the mechanism is placed in the review mode under the fast rewind operation.

FIG. 7 shows the review mode, wherein the fast rewind lever 6 and the fast movement release lever 7 are simultaneouly depressed under the condition where the playback lever 5 is locked. Like elements corresponding to those of FIGS. 1 and 2 are indicated by like numerals.

The operation is similar to that conduct in the cue mode and, therefore, the detailed description is omitted for the purpose of simplicity.

If the operation is desired to be returned to the normal playback mode while the nonprogram section detection operation is conducted, the fast movement release lever 7 is depressed to push the lock lever 2 against the spring 19. The shaft 6a or the shaft 8a retained in the engaging portion 15b or 17b is released therefrom, whereby the fast rewind lever 6 or the fast forward lever 8 is returned to the original position due to the spring 23 or 25. Only the playback lever 5 is maintained at the locked condition. Consequently, the tape player is shifted to the normal playback mode.

When the normal playback operation is desired to be terminated, the stop lever 3 is depressed to push the protrusion 9 through the use of the shaft 3a. The lock lever 1 is shifted left against the spring 18 to release the shaft 5a from the engaging portion 11b, whereby the playback lever 5 is returned to the original position by means of the spring 22. Thus, the tape player is held in the stop mode. The muting circuit 45 can be omitted if it is not required.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A nonprogram section detection mechanism in a cassette tape player comprising:
    nonprogram section detection circuit means for locating a nonprogram section interposed between two adjacent programs recorded on a magnetic tape;
    playback instruction means for conducting a reproduction operation of information recorded in said programs on the magnetic tape while the magnetic tape is driven to travel at a normal playback speed, said playback instruction means including a slidable subchassis, a magnetic reproduction head mounted on said subchassis, and a playback actuating means connected to said subchassis for sliding said subchassis and said magnetic reproduction head in one direction from a first position to a second position when actuated;
    fast movement instruction means for driving the magnetic tape at a fast speed, said fast movement instruction means including a nonprogram section detection slidable plate and a fast movement actuating means connected to said nonprogram section detection slidable plate for sliding said slidable plate in said one direction from a first position to a second position when actuated; and
    switching means for placing said nonprogram section detection circuit in an operative condition only when both said playback instruction means and said fast movement instruction means are actuated, said switching means including a rotatable lever means responsive to actuation of said fast movement actuating means for rotating when said nonprogram section detection slidable plate is slid in said one direction by said fast movement actuating means, and switch means connected between a power source and said nonprogram section detection circuit means and responsive to actuation of said playback actuating means for engaging with said rotatable lever means when said slidable subchassis is slid a certain amount in said one direction by said playback actuating means, said nonprogram section detection circuit means being energized when said switch means engages with said rotatable lever means and providing a detection output when said nonprogram section is located.

2. The nonprogram section detection mechanism of claim 1, further comprising responding means responsive to said detection output derived from said nonprogram section detection circuit means for deactuating said fast movement instruction means when said nonprogram section is located, and placing the tape player in a normal playback mode, said responding means sliding said nonprogram section detection slidable plate from said second position to said first position in response to said detection output and preventing said switch means from engaging with said rotatable lever means.

3. A nonprogram section detection mechanism in a cassette tape player comprising;
a nonprogram section detection circuit for locating a nonprogram section interposed between two adjacent programs recorded on a magnetic tape and for developing a detection output in response thereto;
first movable support means for supporting a magnetic head;
normal playback instruction means for shifting said first movable support means and the magnetic head to a predetermined position thereby conducting a reproduction operation of information recorded on the magnetic tape while the magnetic tape is driven to travel at a normal playback speed;
second movable support means;
fast movement instruction means for shifting said second movable support means to a predetermined position and for driving the magnetic tape at a fast speed,
the shifting of said first movable support means and said second movable support means to said predetermined position in response to actuation of said normal playback instruction means and said fast movement instruction means, respectively, placing the tape player in a nonprogram section detection mode;
switching means mounted on said first movable support means for energizing said nonprogram section detection circuit when said first movable support means has been shifted to said predetermined position by said normal playback instruction means and when actuated; and
actuator means responsive to the movement of said second movable support means for actuating said switching means when said second movable support means has been shifted to said predetermined position by said fast movement instruction means.

4. The nonprogram section detection mechanism of claim 3, further comprising responding means responsive to said detection output derived from said nonprogram section detection circuit for deactuating said fast movement instruction means when said nonprogram section is located, whereby the tape player is placed in a normal playback mode.

5. The nonprogram section detection mechanism of claim 1, 2, 3 or 4, wherein said nonprogram section detection circuit detects a nonrecorded section interposed between two adjacent programs recorded on the magnetic tape.

6. The nonprogram section detection mechanism of claim 2, further comprising first lock means for locking said fast movement actuating means at its actuated position.

7. The nonprogram section detection mechanism of claim 6 wherein said responding means further comprises plunger means for unlocking said fast movement actuating means when a detection output is derived from said nonprogram section detection circuit.

8. The nonprogram section detection mechanism of claim 6 or 7, further comprising a lock release lever for manually unlocking said fast movement actuating means.

9. The nonprogram section detection mehanism of claim 8, further comprising second lock means for locking said playback actuating means at its actuated position.

10. A nonprogram section detection mechanism for use in a tape player, comprising:
nonprogram section detection circuit means for locating a nonprogram section interposed between two adjacent programs recorded on a magnetic tape;
a movable subchassis movable in one direction;
a reproduction magnetic head mounted on said subchassis;
playback actuating means connected to said subchassis for sliding said subchassis and the magnetic head in said one direction from a first position to a second position in response to actuation thereof;
switching means interposed between said detection circuit means and a power source, mounted on said subchassis and movable with said subchassis in response to actuation of said playback actuating means;
a nonprogram section detection slidable plate movable in said one direction;
fast movement actuating means connected to said slidable plate for sliding said slidable plate in said one direction from a first position to a second position in response to actuation thereof and for causing said tape player to move the tape rapidly in a particular direction;
lever means rotatable about a fixed point located between a first end and a second end of said lever means, the first end engaging with a portion of said slidable plate when said fast movement actuating means slides said slidable plate to said second position, said lever means rotating about said fixed point, the second end of said lever means engaging with said switching means when said first end engages with said portion of said slidable plate in response to actuation of said fast movement actuating means and when said playback actuating means slides said subchassis and the switching means mounted thereon to said second position, said program section detection circuit means locating said nonprogram section in response to the engagement of the second end of said lever means with said switching means.

11. A nonprogram section detection mechanism in accordance with claim 10 wherein said detection circuit means develops an output signal when said nonprogram section is located; and
wherein said nonprogram section detection mechanism further comprises further means responsive to said output signal from said detection circuit means for returning said slidable plate to said first position and for stopping the rapid movement of the tape in the particular direction, the second end of said lever means being disengaged from said switching means in response thereto.

12. The nonprogram section detection mechanism of claim 11, wherein said further means comprises plunger means for disengaging said second end of said lever means from said switching means when an output signal is derived from said nonprogram section detection circuit means.

13. The nonprogram section detection mechanism of claim 12, further comprising a lock release lever for manually disengaging said second end of lever means.

14. The nonprogram section detection mechanism of claim 12, further comprising lock means for locking said playback actuating means in an actuated position.

15. A nonprogram section detection mechanism in accordance with claim 10 further comprising:
- amplifier means responsive to an output signal from said magnetic head for amplifying said signal;
- speaker means for reproducing a sound representative of the amplified signal from said amplifier means;
- further switching means;
- fast movement release lever means for actuating said further switching means thereby causing said tape player to perform a cue operation; and
- muting circuit means connected to an input terminal of said amplifier means and responsive to actuation of said further switching means by said fast movement release lever means for attenuating said output signal from said magnetic head.

* * * * *